United States Patent [19]  [11] 4,414,009
Siegmund  [45] Nov. 8, 1983

[54] METHOD OF MAKING AN IMAGE INTENSIFIER FACEPLATE

[75] Inventor: Walter P. Siegmund, Woodstock, Conn.

[73] Assignee: Warner Lambert Technologies, Inc., Southbridge, Mass.

[21] Appl. No.: 387,340

[22] Filed: Jun. 11, 1982

Related U.S. Application Data

[62] Division of Ser. No. 178,317, Aug. 15, 1980, Pat. No. 4,393,322.

[51] Int. Cl.³ ............................................. C03B 23/207
[52] U.S. Cl. ............................................. 65/4.3; 65/13; 65/36; 65/38; 65/55; 65/56
[58] Field of Search ..................... 65/4.3, 13, 36, 38, 65/54, 55, 56

[56] References Cited

U.S. PATENT DOCUMENTS

| | | | |
|---|---|---|---|
| 2,311,704 | 2/1943 | Simison | 65/56 X |
| 2,455,667 | 7/1969 | Snitzer et al. | 65/54 X |
| 3,554,721 | 1/1971 | Gardner | 65/38 X |
| 3,877,912 | 4/1975 | Shiraishi et al. | 65/13 |

FOREIGN PATENT DOCUMENTS 1229528  4/1971  United Kingdom .................... 65/13

Primary Examiner—Arthur D. Kellogg
Attorney, Agent, or Firm—Alan H. Spencer

[57] ABSTRACT

A glass faceplate having a central area of required useful diameter surrounded by a narrow ring of opaque glass and an outer glass mounting flange. Light entering the flange or ring is prevented from reaching the central area as stray light or glare in the system and spurious reflections at the interface of the ring and central area are minimized by a refractive index match of the two innermost glasses.

4 Claims, 5 Drawing Figures

METHOD OF MAKING AN IMAGE INTENSIFIER FACEPLATE

This is a division, of application Ser. No. 178,317, filed Aug. 15, 1980, now Pat. No. 4,393,322.

BACKGROUND OF THE INVENTION

1. Field of the Invention

This invention relates to faceplates for image intensifiers and has particular reference to improvements in clear glass cathode plates.

2. Discussion of the Prior Art

One form of image intensifier tube uses a clear glass cathode (input) faceplate which receives image-forming light intended to be intensified for enhanced viewing. Light entering prior art faceplates near their edges, however, can become reflected from the edges or adjacent portions as stray light which produces glare in the system and degradation of emitted images.

With the above in view, an object of the present invention is to eliminate this cause of stray light in simple and straightforward fashion and without undue cost.

More particularly, the invention has the objective of affording a solution to problems of glare in image-intensifier systems which can be accomplished simply, efficiently and successfully with ordinary skill in the art.

Other objects and advantages of the invention will become more readily apparent from the following description.

SUMMARY OF THE INVENTION

Objects and advantages of the invention are accomplished by provision of a glass faceplate having a central area of useful diameter surrounded by a narrow ring of opaque (black) glass and an outer glass mounting flange. The structure is adaptable to conventional or special image intensifier tubes and uniquely prevents light entering its flange or striking the ring of opaque glass from reaching the central area as stray light or glare in the system. Refractive indices of the central area and opaque ring glasses are preferably approximately matched to prevent spurious reflections at their interface and are further closely matched in expansion coefficients.

Details of the invention will become more readily apparent from the following description when taken in conjunction with the accompanying drawings.

IN THE DRAWINGS

DESCRIPTION OF THE PREFERRED EMBODIMENTS

Figure 1:
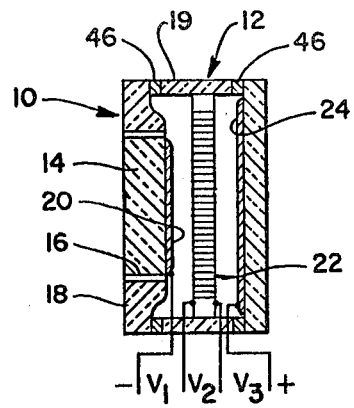
FIG. 1 is an illustration in cross-section of an image intensifier tube incorporating an embodiment of the present invention.
Figure 2:
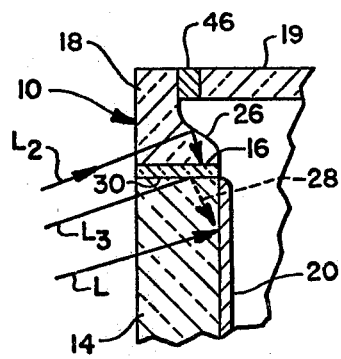
FIG. 2 is an enlarged fragmentary cross-sectional view of a corner of the tube of FIG. 1 wherewith details of the improved faceplate are illustrated with greater clarity.

Faceplate 10 of image intensifier tube 12 is illustrated in FIGS. 1 and 2 as comprising a clear glass portion 14 of useful diameter (typically 18 mm), a thin ring 16 of opaque (light-absorbing) glass having a thickness of approximately 1 mm or less and an outer ring or flange 18 of compatible glass and an overall diameter typically 30 mm, for mounting the faceplate to envelope 19 of tube 12.

Photocathode layer 20, activated by image-forming light passing through portion 14 of plate 10, emits electrons which are drawn through electronmultiplier 22 and received in intensified (multiplied) fashion by phosphor layer 24 for conversion to intensified image-forming light. Electrical potentials $V_1$, $V_2$ and $V_3$ (e.g. 500 V, 1000 V and 5000 V respectively) are used in conventional fashion to accelerate the cathode-emitted electrons through the tube. Those interested in details of the use of photomultipliers may refer to U.S. Pat. No. 3,979,621.

This invention relates more particularly to improvements in light-receiving cathode faceplates and is applicable to various other image intensifier systems including those employing image-inverting means not shown or requiring description herein.

Figure 3:
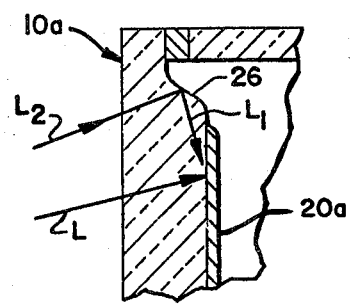
FIG. 3 is a view similar to that of FIG. 2 but which illustrates structure of the prior art for ease of understanding of the improvement afforded by the present invention.

Referring to FIGS. 2 and 3 wherewith improvement of the invention is demonstrated, it can be seen that prior art cathode plates, e.g. plate 10a of FIG. 3, are subject to the production of image glare resulting from stray light reaching the photocathode after reflection from edge 26 of the plate. For example, image-forming light L entering the faceplate outside the useful central area may be reflected from the edge 26 and reach photocathode 20a as stray light $L_1$ causing a veiling glare in the amplified image. An accummulation of similar reflections from edge 26 resulting from light rays $L_2$ seriously degrade images produced and emitted from prior art intensifier tubes employing solid glass cathodes, e.g. of the type illustrated in FIG. 3.

As illustrated in FIGS. 1 and 2, the present invention overcomes the problems of glare in image intensifier systems using solid glass cathode plates as follows:

Plate 10 receives image-forming light L through center portion 14 for activation of photocathode 20 but prevents other light $L_2$ from activating photocathode 20 or otherwise interferring with light L. For example, light $L_2$ entering flange 18 and reflecting from edge 26 becomes absorbed by opaque glass 16 and prevented from reaching portion 14 and/or cathode 20. Also, light directly striking glass 16 becomes similarly absorbed. Additionally, with indices of refraction of glasses 14 and 16 substantially matching, spurious reflections 28 at interface 30 are avoided, i.e. light $L_3$ entering plate 10 along a direct path and striking ring 16 will become absorbed by ring 16.

From the foregoing it should be apparent that the present invention overcomes problems of image degradation in intensifier systems using clear glass plates of the prior art configuration as cathode input faces.

Figure 4:
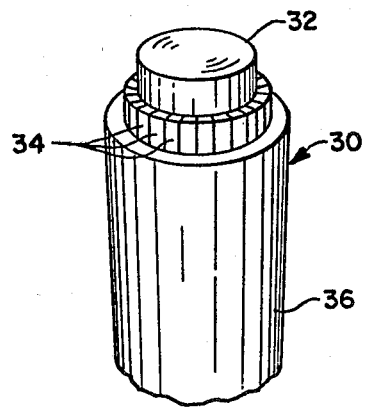
FIG. 4 illustrates, in perspective, the construction of a preform from which image intensifier faceplates may be made according to the invention.
Figure 5:
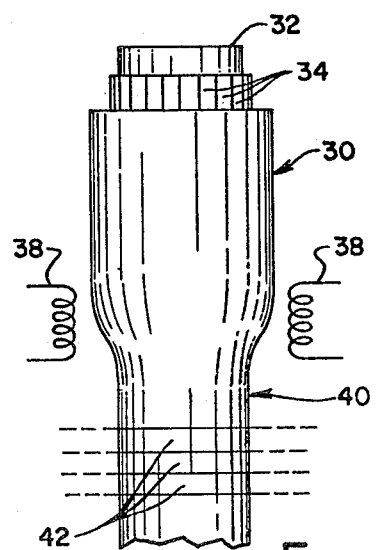
FIG. 5 is a diagrammatic illustration of steps which may be used to work the preform of FIG. 3.

A preferred method of making the present glass cathode plate is illustrated in FIGS. 4 and 5.

A glass preform 30 (FIG. 4) may be constructed of a surface ground and polished rod 32 of central glass which, for reasons of photocathode 20 compatibility, is typically a borosilicate glass. Suitable glasses of this type are readily obtainable from glass suppliers.

Ring 16 glass comprises strips 34 tightly assembled around rod 32. The glass of these strips may be of the type disclosed in U.S. Pat. No. 3,901,718 wherein various exemplary compositions are disclosed. Other suitable compositions may, of course, be used provided the central and strip glasses 32, 34 permit fusion and drawing, i.e. have compatible melting points and expansion coefficients.

Supporting the assembly of strips 34 and rod 32 is one or more tubes 36 of flange 18 glass. Compatibility for fusing and drawing with the former glasses is required. A borosilicate glass is preferred.

Once assembled, preform 30 is heated, e.g. zonally as depicted in FIG. 5 with heating elements 38, and drawn (stretched) to the desired cross-sectional size of faceplate 10. Fiber drawing techniques may be used for this purpose, details of which may be found in U.S. Pat. Nos. 3,037,241; 3,455,667 and 3,278,283.

The boule 40 thus formed (FIG. 5) is annealed and sliced into plates 42 which may be machined into desired shape, e.g. that illustrated in FIGS. 1 and 2. Cathode 20 is applied and flange 18 is sealed to envelope 44 preferably with a suitable soft metallic ring 46.

Those skilled in the art will appreciate that various modifications of the present invention may be made to suit particular requirements without departure from the spirit of the invention. Accordingly, the present illustrations are not to be interpreted as restrictive beyond that necessitated by the following claims.

I claim:

1. The method of making faceplates for image intensifiers comprising the steps of:

grinding and polishing the side of a glass rod;

assembling against said rod a closely related succession of relatively thin pieces of light-absorbing glass;

fitting a tube of supporting glass over said assembly of pieces and rod;

heating and stretching the resulting faceplate preform into a boule;

annealing and transaxially slicing flat plates from said boule; and machining said flat plates to configurations desired of said faceplates.

2. The method according to claim 1 wherein said glass rod is formed to a diametral dimension greater than 18 mm and said preform is drawn to a boule diameter of approximately 18 mm.

3. The method according to claim 2 wherein the thickness of pieces of said light-absorbing glasses of said preform are such as to approximate 1 mm when said preform is drawn to said boule diameter of approximately 18 mm.

4. The method according to claim 1 including the step of applying a photocathode coating to one side of said drawn and sliced glass rod component of said machined plates.

* * * * *